(12) United States Patent
Choi et al.

(10) Patent No.: US 11,272,497 B2
(45) Date of Patent: Mar. 8, 2022

(54) WIRELESS COMMUNICATION APPARATUS AND OPERATION METHOD THEREOF

(71) Applicant: SAMSUNG ELECTRONICS CO., LTD., Suwon-si (KR)

(72) Inventors: Sinyong Choi, Suwon-si (KR); Jaewon Kim, Suwon-si (KR); Wonseok Jeong, Suwon-si (KR); Ilmuk Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 159 days.

(21) Appl. No.: 16/831,139

(22) Filed: Mar. 26, 2020

(65) Prior Publication Data
US 2021/0037507 A1 Feb. 4, 2021

(30) Foreign Application Priority Data

Aug. 2, 2019 (KR) .................. 10-2019-0094540

(51) Int. Cl.
*H04W 72/04* (2009.01)
*H04W 28/04* (2009.01)
*H04W 4/70* (2018.01)

(52) U.S. Cl.
CPC ........... *H04W 72/042* (2013.01); *H04W 4/70* (2018.02); *H04W 28/04* (2013.01)

(58) Field of Classification Search
CPC ..... H04W 72/042; H04W 4/70; H04W 28/04; H04L 1/08; H04L 1/0038; H04L 1/18; H04L 1/0047; H04L 5/0053; H04B 17/309
See application file for complete search history.

(56) References Cited

U.S. PATENT DOCUMENTS

| | | | |
|---|---|---|---|
| 9,036,498 B2 | 5/2015 | Perets | |
| 9,167,574 B2 | 10/2015 | Chen et al. | |
| 9,204,325 B2 | 12/2015 | Subramanian et al. | |
| 9,686,783 B1* | 6/2017 | Patel | H04L 5/0053 |
| 9,860,913 B2 | 1/2018 | Farkas et al. | |
| 10,164,754 B1 | 12/2018 | Patel et al. | |
| 2013/0223252 A1* | 8/2013 | Perets | H04L 1/0045 370/252 |
| 2016/0234810 A1 | 8/2016 | Wong et al. | |
| 2017/0099677 A1* | 4/2017 | Farkas | H04W 72/1294 |
| 2018/0199317 A1 | 7/2018 | Hwang et al. | |
| 2019/0021098 A1 | 1/2019 | Huang et al. | |
| 2020/0404669 A1* | 12/2020 | Seo | H04W 76/27 |

* cited by examiner

*Primary Examiner* — Farid Seyedvosoghi
(74) *Attorney, Agent, or Firm* — F. Chau & Associates, LLC

(57) ABSTRACT

A method of operating a wireless communication apparatus is described. The method includes receiving, a repeated physical downlink control channel (PDCCH) from a base station, performing blind decoding on a plurality of candidate PDCCHs, performing a cyclic redundancy check (CRC), comparing the at least two pieces of control information with each other, and determining whether to terminate the blind decoding based on the comparison.

20 Claims, 13 Drawing Sheets

WIRELESS COMMUNICATION APPARATUS AND OPERATION METHOD THEREOF

CROSS-REFERENCE TO RELATED APPLICATION

This application claims the benefit of Korean Patent Application No. 10-2019-0094540, filed on Aug. 2, 2019, in the Korean Intellectual Property Office, the disclosure of which is incorporated by reference herein in its entirety.

BACKGROUND

The inventive concept relates to a wireless communication apparatus, and more particularly, to a method of reducing the probability of a false alarm during decoding.

Wireless communication apparatuses may include a variety of devices such as cell phones, modems, refrigerators, electronic watches, and televisions. A wireless communication apparatus performs encoding and decoding processes to transmit data to or receive data from a base station. The wireless communication apparatus also performs channel scheduling based on information obtained during the decoding process. A check process is then performed by the wireless communication apparatus to determine if the information obtained during the decoding process is sufficient. A failure of the check process will produce an alarm response.

When the check determines a failure, the failure may be due to a false alarm. A false alarm may be a product of the communication environment, and may cause the wireless communication apparatus to perform channel scheduling based on incorrect information.

Channel scheduling with incorrect information produces a mismatch with the channel scheduling of the base station, which causes throughput of the wireless communication apparatus to decrease. It may also result in unnecessary power consumption. Therefore, there is a need in the art for a method to prevent the occurrence of a false alarms to improve communication performance and reduce unnecessary power consumption.

SUMMARY

Embodiments of the inventive concept provides a wireless communication apparatus capable of detecting in advance a situation that may cause a false alarm by using characteristics of a physical downlink control channel (PDCCH) transmitted repeatedly in a certain search space from a base station.

According to an aspect of the inventive concept, an method of operating a wireless communication apparatus includes receiving a repeated physical downlink control channel (PDCCH), performing blind decoding on a plurality of candidate PDCCHs based on an aggregation level of the PDCCH, performing a cyclic redundancy check (CRC) to obtain at least two pieces of control information passing the CRC from a blind decoding result, comparing the at least two pieces of control information with each other, and determining whether to terminate the blind decoding, based on a comparison result.

According to another aspect of the inventive concept, an method of operating a wireless communication apparatus includes receiving a repeated physical downlink control channel (PDCCH) from a base station, obtaining first control information by performing first decoding and a first CRC on a plurality of candidate PDCCHs based on an aggregation level of the PDCCH, obtaining second control information by performing second decoding and a second CRC on the plurality of candidate PDCCHs, determining whether the first control information and the second control information are identical to each other, and performing channel scheduling for communication with the base station based on the determination.

According to another aspect of the inventive concept, a wireless communication apparatus includes a transceiver configured to receive a physical downlink shared channel (PDCCH) repeatedly transmitted in a search space from a base station, and a processor configured to perform blind decoding on a plurality of candidate PDCCHs based on an aggregation level of the PDCCH, wherein the processor is further configured to compare at least two pieces of control information passing a cyclic redundancy check (CRC) from a blind decoding result with each other, and perform channel scheduling for communication with the base station, based on a comparison result.

According to another aspect of the inventive concept, a method of wireless communication includes receiving a first version of a PDCCH from a base station; identifying a first piece of control information from the first version of the PDCCH based on a blind decoding process; receiving a second version of a PDCCH from the based station; identifying a second piece of control information from the second version of the PDCCH based on the blind decoding process; determining that the second piece of control information is different from the second piece of control information; and refraining from communicating with the base station according to the first piece of control information based on the determination that the second piece of control information is different from the second piece of control information.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The present disclosure relates to systems and methods for preventing false alarms during the decoding check process of a wireless communication device. A false alarm occurs when a cyclic redundancy check (CRC) performed on a physical downlink control channel (PDCCH) indicates a success, but where the CRC result is mistaken due to a communication problem. The false alarm may influence communication performance of a wireless communication apparatus. For example, a wireless communication device may falsely detect a grant for transmitting data to a base station, but since the detected grant is not correct, the base station will not receive any data transmitted based on the false alarm. The inventive concept reduces the occurrence of a false alarm to improve communication performance and reduce unnecessary power consumption.

In a communication system such as narrow-band Internet-of-things (NB-IoT) or enhanced-machine type communication (eMTC), a PDCCH is repeatedly transmitted in a certain search space. The inventive concept reduces the occurrence of a false alarm based on the repeated transmission of the PDCCH. Control information, which may cause a false alarm, may be detected and filtered by performing blind decoding and comparing control information passing the CRC with the repeated control information whether they are identical to each other.

Hereinafter, embodiments of the inventive concept will be described in detail with reference to the accompanying drawings.

Figure 1:
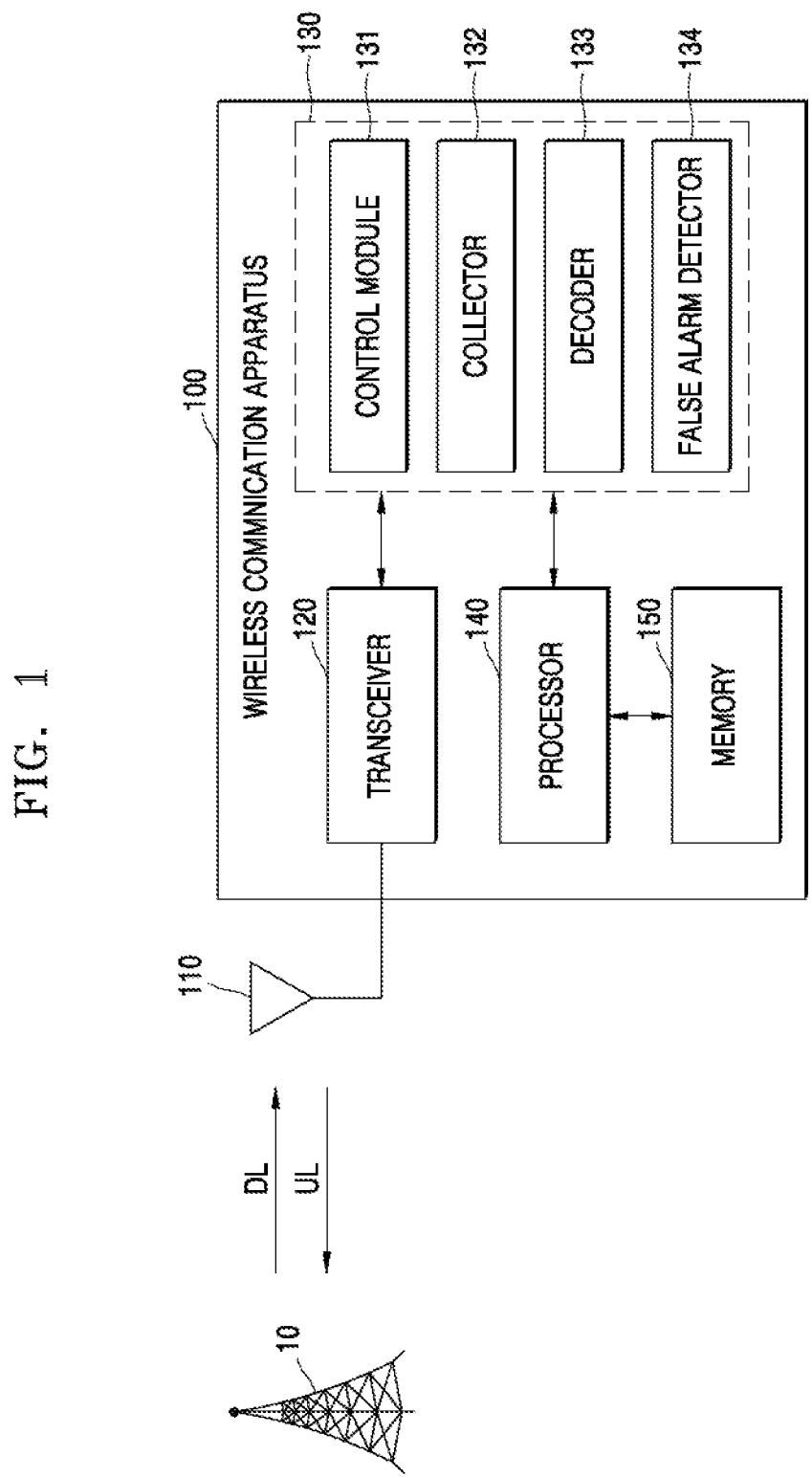
FIG. 1 is a block diagram of a wireless communication system according to an embodiment of the inventive concept.

FIG. 1 is a block diagram of a wireless communication system 1 according to an embodiment of the inventive concept.

The wireless communication system 1 may be, for example, a long-term evaluation (LTE) system, a 5G system, a code division multiple access (CDMA) system, a global system for mobile communications (GSM) system, a wireless local area network (WLAN) system, or another wireless communication system. Although assumed herein that the wireless communication system 1 is an LTE system, and particularly, a narrow-band Internet-of-things (NB-IoT) or an enhanced-machine type communication (eMTC), embodiments of the inventive concept are not limited thereto.

Referring to FIG. 1, the wireless communication system 1 may include a wireless communication apparatus 100 and a base station 10. The wireless communication apparatus 100 and the base station 10 may communicate with each other via a downlink channel (DL) and an uplink channel (UL). The wireless communication apparatus 100 may include an antenna 110, a transceiver 120, a signal processing module 130, a processor 140, and a memory 150.

The wireless communication apparatus 100 may refer to various types of devices capable of communicating with the base station 10 to transmit or receive a data signal and/or control information. For example, the wireless communication apparatus 100 may be referred to as a user equipment (UE), a mobile station (MS), a mobile terminal (MT), a user terminal (UT), a subscribing station, a portable device, or the like. The base station 10 may refer to a fixed station that communicates with the wireless communication apparatus 100 and/or another base station. The base station 10 may be referred to as a node B, an evolved-node B (eNB), a base transceiver system (BTS), an access point (AP), or the like.

A wireless communication network between the wireless communication apparatus 100 and the base station 10 may share available network resources. Therefore, support communication between multiple users. For example, information may be transmitted via the wireless communication network, according to various schemes. The various schemes may be code division multiple access (CDMA), frequency division multiple access (FDMA), time division multiple access (TDMA), orthogonal frequency division multiple access (OFDMA), and single carrier-frequency division multiple (SC-FDMA).

The transceiver 120 may receive a PDCCH from the base station 10 through the antenna 110. The PDCCH may be used to transmit control information or downlink control information (DCI), such as scheduling decision and a power control command. Hereinafter, receiving a channel may be understood to mean receiving control information and/or data transmitted in radio resources assigned to the channel. Decoding a channel may be understood to mean decoding information transmitted in radio resources and/or data assigned to the channel. The PDCCH may be an NPDCCH (or an NB-PDCCH) when the wireless communication system 1 is an NB-IoT communication system and be an MPDCCH when the wireless communication system 1 is an eMTC system.

Hereinafter, for brevity of description, the NPDCCH (or the NB-PDCCH) and the MPDCCH may be referred to collectively as the PDCCH. The PDCCH may be repeatedly transmitted in a certain search space, as will be described in detail later. Hereinafter, the search space refers to a set of candidate PDCCHs with control channel elements (CCEs) that the wireless communication apparatus 100 may attempt to decode at a given aggregation level. For example, a PDCCH may have an aggregation level of 1, 2, 4, or 8, which may indicate the number of times the PDCH is repeated in the search space.

The aggregation level may be determined by system parameters such as cyclic prefix (CP) length, subframe setting, a PDCCH format, a localized or distributed transmission scheme, and the total number of CCEs. The transceiver 120 may generate a baseband signal by frequency down-converting a radio-frequency (RF) signal including the received PDCCH. Additionally, the transceiver 120 may provide the baseband signal to the processor 140.

The signal processing module 130 may include a control module 131, a collector 132, a decoder 133, and a false alarm detector 134. All or some of the components of the signal processing module 130 may be hardware such as specific application integrated circuits, field-programmable gate arrays, a combination of logic gates, system-on-chips, and various types of processing circuits. Furthermore, all or some of the components of the signal processing module 130 may be software such as instructions or codes that are executable by the processor 140.

The control module 131 may determine radio resources configured for transmitting the PDCCH. The collector 132 may collect the radio resources configured for transmitting the PDCCH. The decoder 133 may perform blind decoding on a plurality of candidate PDCCHs based on an aggregation level of the PDCCH. The decoder 133 may perform CRC on control information obtained as a blind decoding result. Hereinafter, for brevity of description, the control information provided from the decoder 133 to the false alarm detector 134 may be assumed to pass the CRC.

According to an embodiment of the inventive concept, the false alarm detector 134 may compare at least two pieces of control information with each other. The at least two pieces of control information may be obtained from the blind decoding result and pass the CRC. The false alarm detector 134 may compare a first control information with a second control information obtained from the decoder 133 after the first control information. Hereinafter, the control information may be determined as a cause of a false alarm, and may be defined as target control information. Additionally, the control information may be used for channel scheduling when the control information is determined not to be a cause of the. The decoder 133 may repeatedly perform blind decoding when the first control information passing the CRC is obtained by blind decoding. The blind decoding may be performed until a certain blind decoding termination condition is satisfied without ending the blind decoding. Therefore, the decoder 133 may perform blind decoding to obtain the second control information about the first control information. In this case, the first control information may correspond to the target control information. The false alarm detector 134 may identify whether the first control information and the second control information are identical to each other.

The identification is based on the PDCCH being repeatedly transmitted in a certain search space. For example, because the PDCCH is repeatedly transmitted in the search space, the first control information and the second control information are theoretically identical to each other. The false alarm detector 134 may regard the first control information as a factor that may cause a false alarm. The false alarm detector 134 may then continuously perform a comparison to search for other control information to be used for channel scheduling when the first control information and the second control information are not identical to each other. In detail, when the first control information and the second control information are not identical to each other, the false alarm detector 134 may compare a third control information obtained from the decoder 133, after the second control information with the second control information, to determine whether the third control information and the second information are identical with each other. In this case, the second control information may be target control information. As described above, the false alarm detector 134 may determine whether the second control information is a factor that may cause a false alarm.

In one embodiment, when the first control information and the second control information are identical to each other, the false alarm detector 134 may further compare the third control information with the first control information to determine whether the third control information and the first information are identical with each other. The third control information may be obtained from the decoder 133 after the second control information. As described above, the false alarm detector 134 may determine whether the first control information is a factor that may cause a false alarm by comparing at least one piece of control information obtained about the first control information. Additionally, the false alarm detector 134 may terminate a blind decoding operation of the decoder 133 when the number of pieces of control information matching the first control information is greater or equal to a reference value. The false alarm detector 134 may also provide the first control information to the processor 140. In one embodiment, the reference value may vary according to a communication environment with the base station 10 of the wireless communication apparatus 100. Therefore, the processor 140 may perform channel scheduling for transmission of data to and reception of data from the base station 10, based on the first control information.

In one embodiment, the false alarm detector 134 may use the memory 150 for a comparison between pieces of control information. In detail, the false alarm detector 134 may store target control information in the memory 150. The false alarm detector 134 may also read the target control information from the memory 150 for a comparison with control information obtained about the target control information.

For example, the processor 140 may perform channel scheduling based on control information verified by the false alarm detector 134. Channel scheduling may be understood to mean either downlink scheduling performed using control information, including physical downlink shared channel (PDSCH) resource designation, a transmission format, hybrid automatic repeat request (HARQ) information, and spatial multiplexing-related control information, or uplink scheduling performed using control information, including physical uplink shared channel (PUSCH) resource designation, a transmission format, and HARQ information.

Although an operation according to the inventive concept is performed by the false alarm detector 134 is described above with reference to FIG. 1, the inventive concept is not limited thereto and the operation may be performed by the processor 140.

The wireless communication apparatus 100 according to an embodiment of the inventive concept may identify (or detect) control information that may cause a false alarm by comparing pieces of control information with each other, in consideration of characteristics of a PDCCH repeatedly transmitted in a certain search space. The wireless communication apparatus 100 may also prevent the identified control information from being used for channel scheduling. Therefore, a probability of occurrence of a false alarm of the wireless communication apparatus 100 may be significantly reduced. A reduction in occurrence of a false alarm may improve the communication performance of the wireless communication apparatus 100 and reducing unnecessary power consumption.

Figure 2:
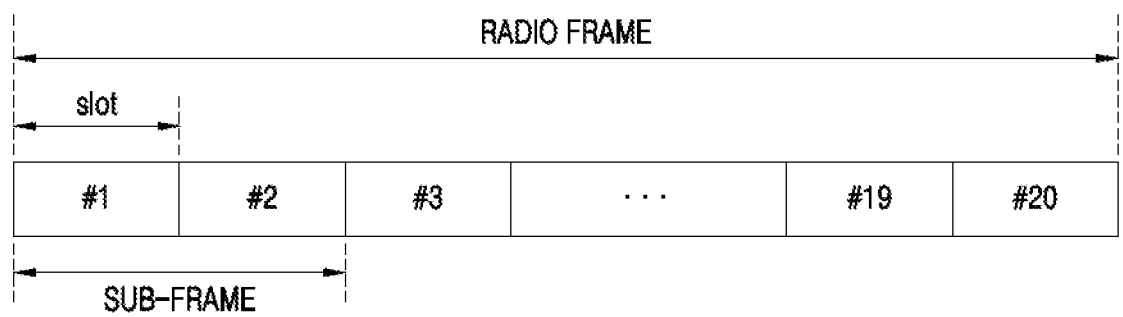
FIG. 2 is a diagram illustrating a radio frame structure of a wireless communication system to which the inventive concept is applicable.

FIG. 2 is a diagram illustrating a radio frame structure of a wireless communication system to which the inventive concept is applicable.

Referring to FIG. 2, a radio frame may use 10 subframes. One radio frame includes 20 slots each with a length of 0.5 ms, and indexes of 1 to 20 may be respectively assigned to the slots. One subframe may include two consecutive slots in a time domain. Thus, a first subframe may include slot 1 and slot 2. In general, a subframe i may include a slot 2$i$ and a slot (2$i$+1). A time period determined to transmit one subframe is referred to as a transmission time interval (TTI). For example, one subframe may have a length of 1 ms and one slot may have a length of 0.5 ms.

One slot may include a plurality of orthogonal frequency division multiplexing (OFDM) symbols in a time domain and include a plurality of resource blocks (RBs) in a frequency domain. In 3GPP LTE, OFDMA is used in a downlink. Therefore, an OFDM symbol is intended to represent one symbol period. An OFDM symbol may be referred to as a SC-FDMA symbol or a symbol period. The resource block refers to a resource assignment unit, and one slot may include a plurality of consecutive subcarriers.

Figure 3:
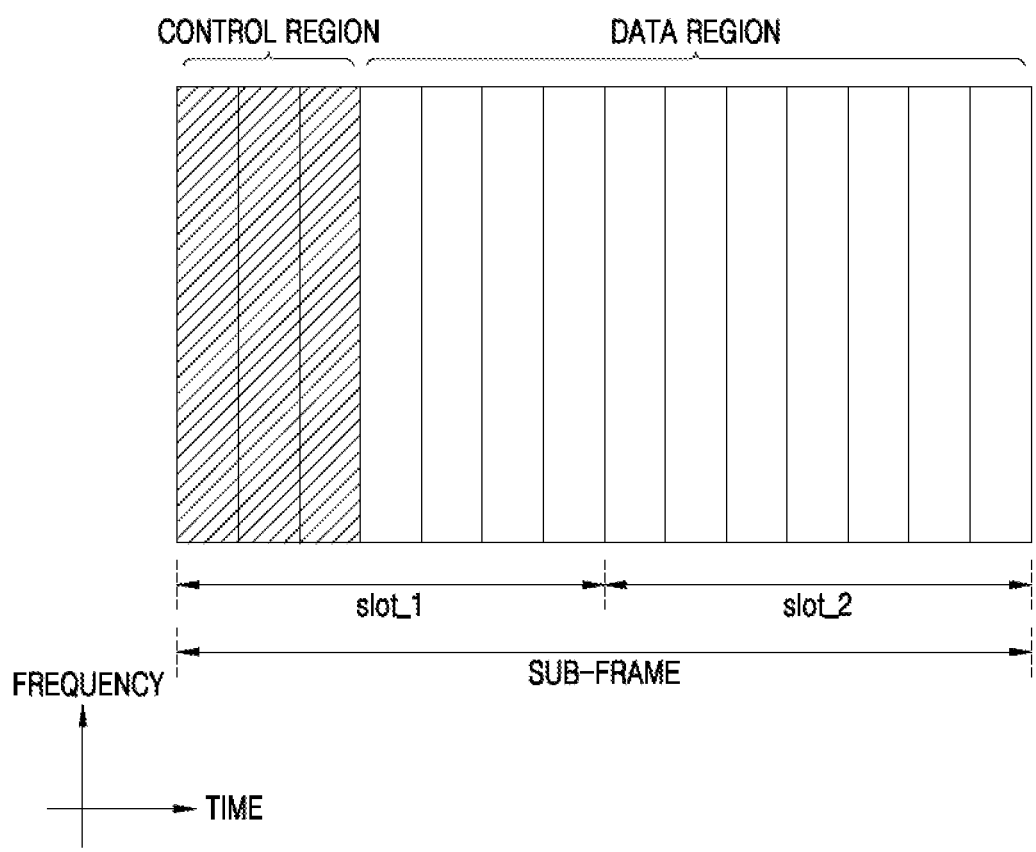
FIG. 3 is a diagram illustrating a structure of a downlink subframe in a wireless communication system to which the inventive concept is applicable.

FIG. 3 is a diagram illustrating a structure of a downlink subframe in a wireless communication system to which the inventive concept is applicable.

Referring to FIG. 3, in a subframe, up to three first OFDM symbols in a first slot slot_1 correspond to a control region to which control channels are assigned. The remaining OFDM symbols correspond to a data region to which PDSCHs are assigned. Examples of downlink control channels used in 3 GPP LTE include a physical control format indicator channel (PCFICH), a physical downlink control channel (PDCCH), a physical hybrid-ARQ indicator channel (PHICH), and the like. The PCFICH is transmitted in a first OFDM symbol of the subframe and carries information regarding the number of OFDM symbols (i.e., the size of the control region) used for transmission of control channels within the subframe. The PHICH is a response channel for an uplink and carries an acknowledgement (ACK) and a not-acknowledgement (NACK) signal for a hybrid automatic repeat request (HARQ). Control information transmitted via the PDCCH is also referred to as downlink control information (DCI). The DCI includes uplink resource assignment information, downlink resource assignment information or an uplink transmission (Tx) power control command for any wireless communication apparatus group. In detail, the PDCCH may carry resource assignment information and a transmission format of a downlink shared channel (DL-SCH) and carry resource assignment information of an uplink shared channel (ULSCH). Additionally, the PDCCH may carry paging information of a paging channel (PCH) and carry system information of the DL-SCH. The PDCCH may also carry resource assignment information for an upper-layer control message such as a random access response transmitted in the PDSCH, carry a set of transmission power control commands for individual wireless communication apparatuses belonging to any wireless communication apparatus group, carry information regarding activation of voice over internet protocol (VoIP), and the like. A plurality of PDCCHs may be transmitted in the control region, and the wireless communication apparatus may monitor the plurality of PDCCHs. The PDCCH contains one control channel element (CCE) or a set of consecutive CCEs. A CCE is a logical assignment unit used to provide the PDCCH with a coding rate according to a state of a radio channel. A CCE corresponds to a plurality of resource element groups. A format of the PDCCH and the number of available PDCCH bits are determined according to a correlation between the number of CCEs and a coding rate provided by the CCEs.

The base station determines a PDCCH format according to control information to be transmitted to a wireless communication apparatus. Additionally, the base station attaches cyclic redundancy check (CRC) data to the control information. In the CRC data, a unique identifier (or a radio network temporary Identifier (RNTI)) is masked according to the owner or purpose of the PDCCH. In the case of a PDCCH for a wireless communication apparatus, a unique identifier, e.g., a cell-RNTI (C-RNTI), of the wireless communication apparatus may be masked in the CRC data. Alternatively, in the case of a PDCCH for a paging message, a paging indicator identifier, e.g., paging-RNTI (P-RNTI), may be masked in the CRC data. In the case of a PDCCH for system information, and more particularly, a system information block (SIB), a system information identifier, e.g., a system information RNTI (SI-RNTI), may be masked in the CRC data. A random access-RNTI (RA-RNTI) may be masked in the CRC data to indicate a random access response. The random access response may be a response to transmission of a random access preamble of the wireless communication apparatus.

Embodiments of the inventive concept are applicable to a wireless communication apparatus that receives an enhanced PDCCH (EPDCCH). The EPDCCH is obvious to those of ordinary skill in the art. Therefore, a detailed description thereof is omitted herein.

Figure 4:
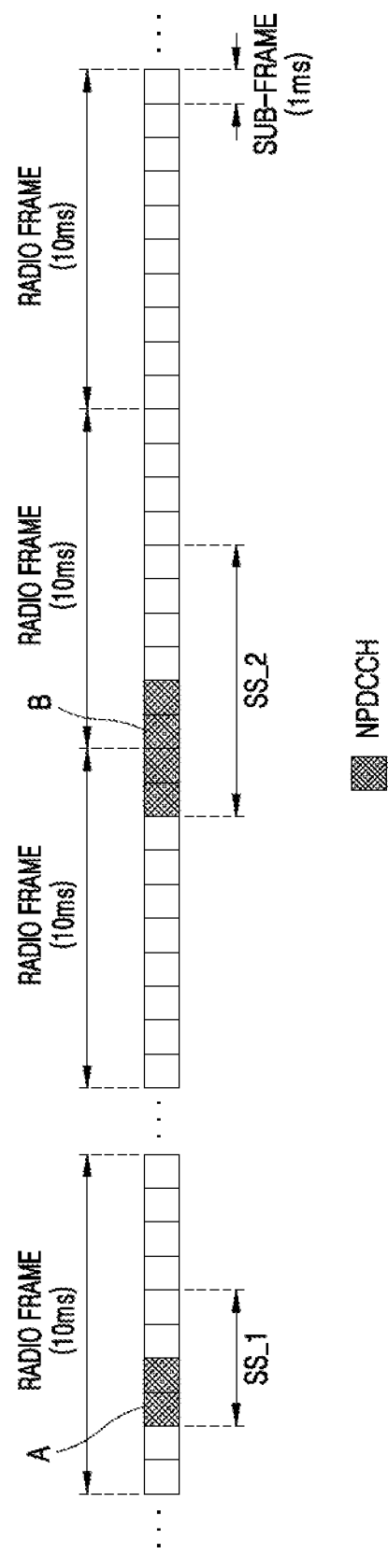
FIG. 4 is a diagram illustrating an example of a transmission scheme of a narrowband physical downlink control channel (NPDCCH) in an NB-IoT communication system.

FIG. 4 is a diagram illustrating an example of a transmission scheme of a NPDCCH in an NB-IoT communication system to which the inventive concept is applicable. FIG. 4 is provided merely for brevity of description and is not intended to limit the scope of the inventive concept, and the scheme of FIG. 4 is applicable to a transmission scheme of an MPDCCH in an eMTC system.

Referring to FIG. 4, an NPDCCH and an NPDSCH (not shown) corresponding thereto may be assumed to be transmitted in a scheduled carrier and transmitted in units of subframes. A wireless communication apparatus may monitor search spaces SS_1 and SS_2 (e.g., four subframes and eight subframes) which are set for each NPDCCH to receive the NPDCCH. Here, the monitoring of the search spaces may refer to a process of decoding the NPDCCH in the search spaces and scrambling corresponding CRC data with a predetermined specific RNTI value to check whether the scrambling result is identical to a desired value.

In the case of an NB-IoT communication system, the NPDCCH and/or the NPDSCH may be repeatedly transmitted as illustrated in FIG. 4. For example, assuming the NPDCCH is transmitted in one subframe unit, the NPDCCH may be repeatedly transmitted twice (A) in the first search space SS_1 or be repeatedly transmitted four times (B) in the second search space SS_2. In addition, an NPDSCH (not shown) corresponding to each NPDCCH may be repeatedly transmitted. A maximum number of times of repeatedly transmitting the NPDCCH may vary according to a random access situation, a dedicated connection situation, a paging situation, and the like. Information thereof may be provided to the wireless communication apparatus by a transmission of a radio resource control (RRC) signaling message by the base station.

According to embodiments of the inventive concept, a wireless communication apparatus may determine whether target control information can cause a false alarm by repeatedly performing blind decoding on an NPDCCH. Performing blind decoding on an NPDCCH is repeated within a search space, in units of TTIs (or in units of subframes) and comparing pieces of control information passing a CRC with each other.

Figure 5:
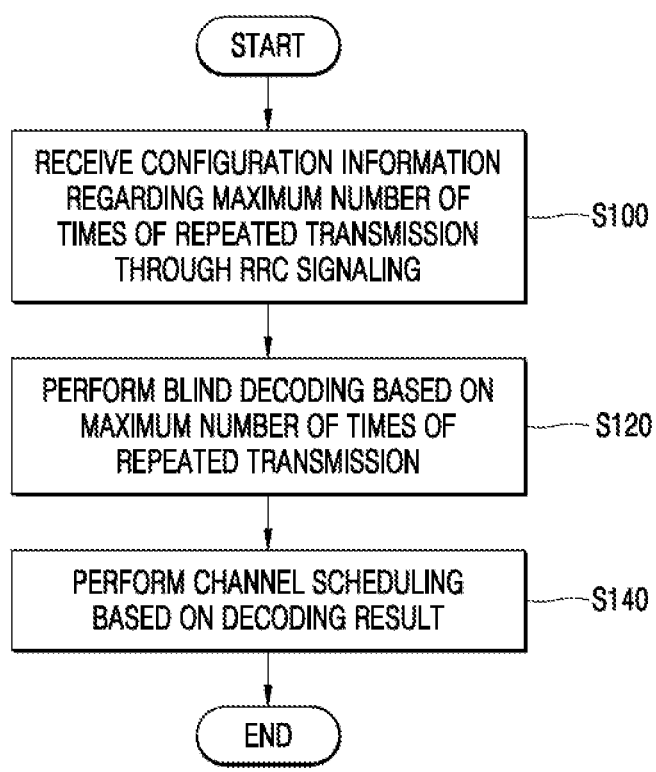
FIG. 5 is a flowchart of an method of operating a wireless communication apparatus according to an embodiment of the inventive concept.

FIG. 5 is a flowchart of an method of operating a wireless communication apparatus according to an embodiment of the inventive concept.

Referring to FIG. 5, the wireless communication apparatus may receive configuration information regarding a maximum number of times of repeated transmission through RRC signaling with a base station (S100). The wireless communication apparatus may perform blind decoding based on the maximum number of times of repeated transmission (S120). In detail, the wireless communication apparatus may repeatedly perform blind decoding on a plurality of candidate PDCCHs, based on an aggregation level of a PDCCH. The blind decoding is performed on the PDCCH repeatedly transmitted within a certain search space by a base station. The PDCCH may be transmitted units of TTIs.

Thus, the wireless communication apparatus obtain at least two pieces of control information passing a CRC. The wireless communication apparatus may identify and filter control information that may cause a false alarm by determining whether the at least two pieces of control information are identical to each other. The wireless communication apparatus may perform channel scheduling based on a decoding result (S140). For example, the wireless communication apparatus may perform channel scheduling by selectively using control information determined not to cause a false alarm, thereby significantly reducing a probability of occurrence of a false alarm in the wireless communication apparatus.

Figure 6:
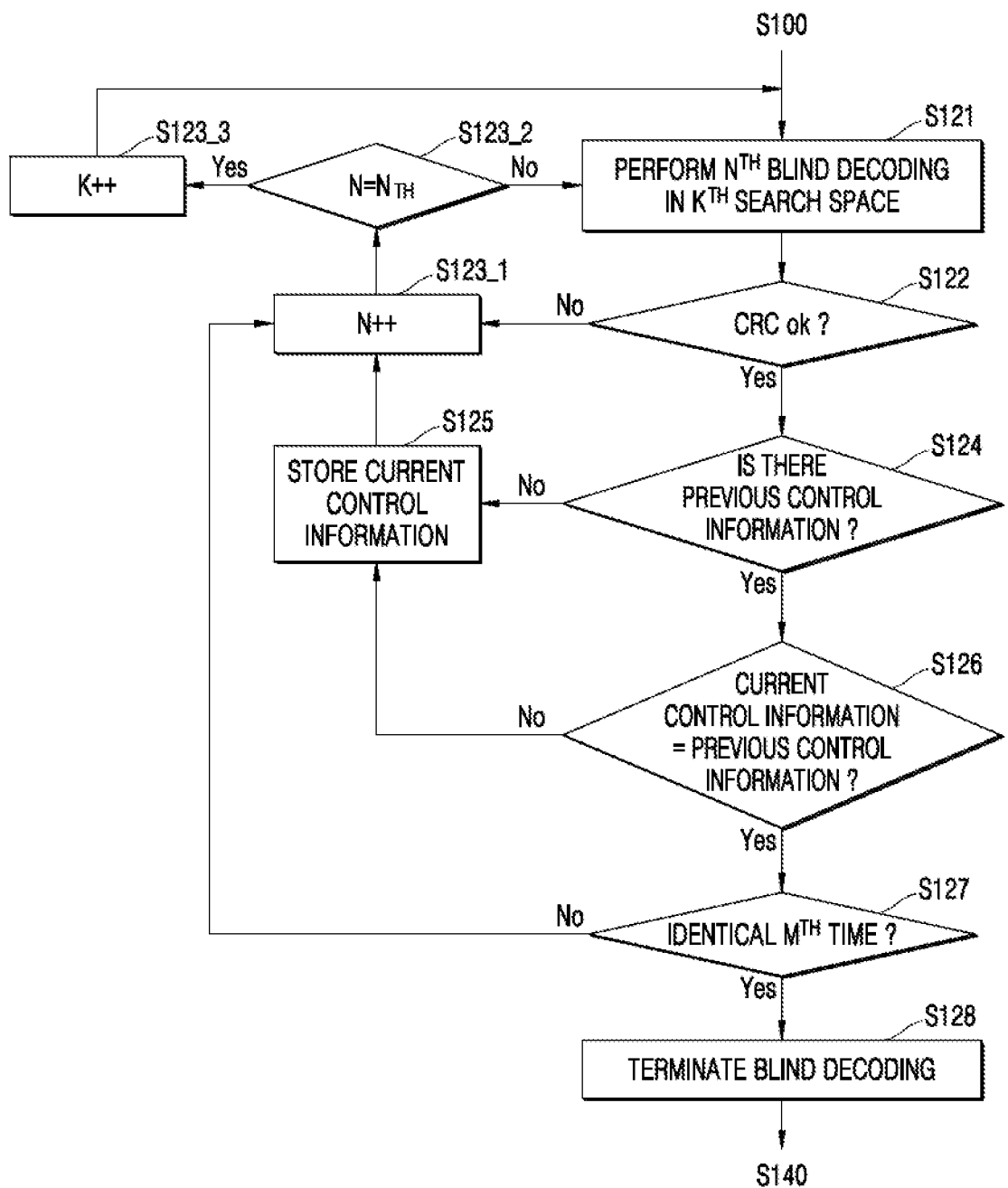
FIG. 6 is a flowchart of a blind decoding method of a wireless communication apparatus according to an embodiment of the inventive concept.

FIG. 6 is a flowchart of a blind decoding method of a wireless communication apparatus according to an embodiment of the inventive concept.

Referring to FIG. 6, referring to operation S100 of FIG. 5, the wireless communication apparatus may perform $N^{th}$ blind decoding in a $K^{th}$ search space (here, K is an integer greater than or equal to 1) (S121). For reference, N is an integer greater than or equal to 1. The $N^{th}$ blind decoding may refer to blind decoding on candidate PDCCHs corresponding to an $N^{th}$ subframe.

A CRC is performed on control information obtained in operation S121 and whether the control information passes the CRC may be determined (S122). When 'No' is determined in operation S122, 'N' may be counted up (S123_1) where there is a determination as to whether N exceeds a threshold $N^{th}$ (S123_2). Operation S121 may be performed when 'No' is determined in operation S123_2, and 'K' may be counted up (S123_3) and operation S121 may be performed when 'Yes' is determined in operation S123_2. Target control information stored in a memory of the wireless communication apparatus may be deleted before blind decoding is performed in a new search space. The deletion of the target control information will be described in detail later.

When 'Yes' is determined in operation S122, the wireless communication apparatus may determine whether there is previous control information obtained in operations S121 and S122 (S124).

When 'No' is determined in operation S124, the wireless communication apparatus may store current control information as target control information (S125) and perform operation 123_1. When 'Yes' is determined in operation S124, the current control information and the previous control information may be determined to be identical to each other (S126).

When 'No' is determined in operation S126, the wireless communication apparatus may delete previous control information stored in the memory and store the current control information as target control information (S125). When 'Yes' is determined in operation S126, the wireless communication apparatus may determine an $M^{th}$ time whether the target control information is identical to control information obtained about the target control information (here, M is an integer greater than or equal to 1) (S127). M is a reference value and may vary according to a communication environment and the like of the wireless communication apparatus. For example, M may be set to be relatively higher as a communication environment of the wireless communication apparatus decreases.

Additionally, M may be set to be relatively lower as the communication environment of the wireless communication apparatus increases. For example, when M is 2, the wireless communication apparatus may consecutively determine whether target control information is identical to each of two pieces of control information obtained about the target control information. When M is 1, the wireless communication apparatus may determine whether target control information is identical to a piece of control information obtained about the target control information.

The wireless communication apparatus may perform operation S123_1 when 'No' is determined in operation S127. Additionally, the wireless communication apparatus may perform end blind decoding when 'Yes' is determined in operation S127 (S128). Therefore, operation S140 of FIG. 5 may be performed using the target control information.

Thus according to one embodiment of the inventive concept, a method of wireless communication includes receiving a first version of a PDCCH from a base station; identifying a first piece of control information from the first version of the PDCCH based on a blind decoding process; receiving a second version of a PDCCH from the based station; identifying a second piece of control information from the second version of the PDCCH based on the blind decoding process; determining that the second piece of control information is different from the second piece of control information; and refraining from communicating with the base station according to the first piece of control information based on the determination that the second piece of control information is different from the second piece of control information.

In some cases, the method includes receiving one or more additional versions of the PDCCH from the base station; identifying one or more additional pieces of control information from the one or more additional versions of the PDCCH based on the blind decoding process; determining that the one or more additional pieces of control information are equal to the second piece of control information; terminating the blind decoding process based on determining that the one or more additional pieces of control information are equal to the second piece of control information; and communicating with the base station based on the second piece of control information.

In some cases, the method includes determining that a number of the one or more additional pieces of control information that are equal to the second piece of control information is greater than or equal to a reference value. In some cases, the method includes identifying channel scheduling information based on the second piece of control information, wherein communicating with the base station is based on the channel scheduling information.

Figure 7A:
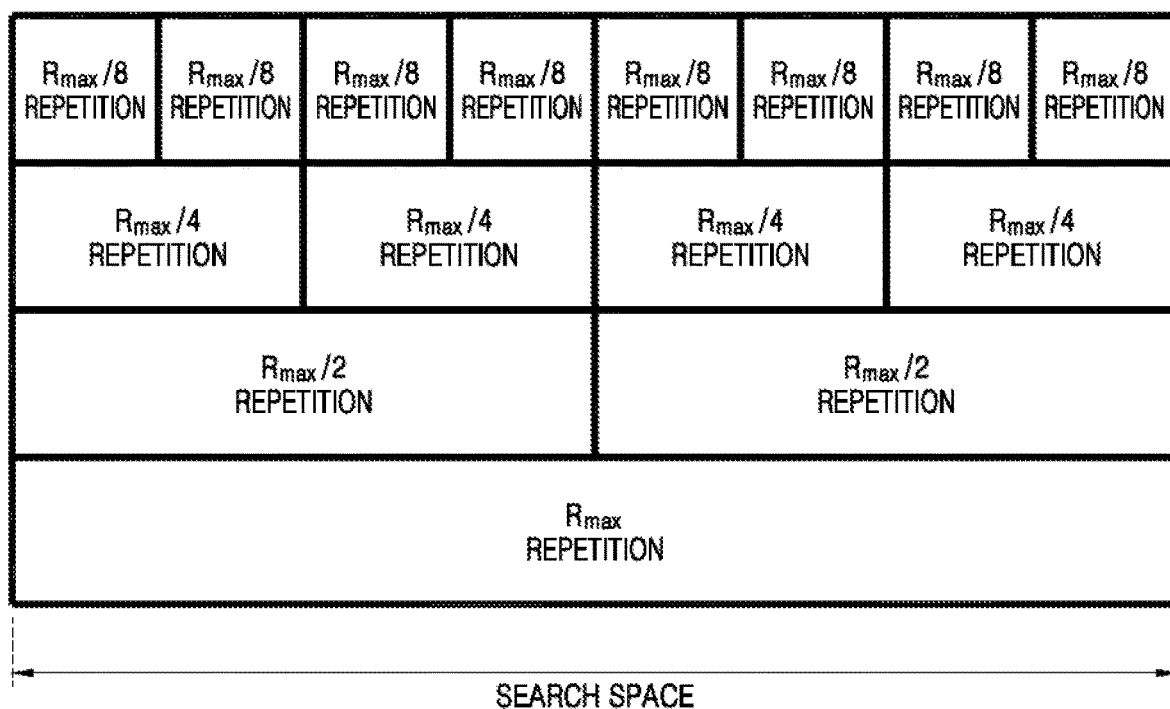
FIG. 7A is a diagram for explaining a PDCCH repeatedly transmitted in a search space.
Figure 7B:
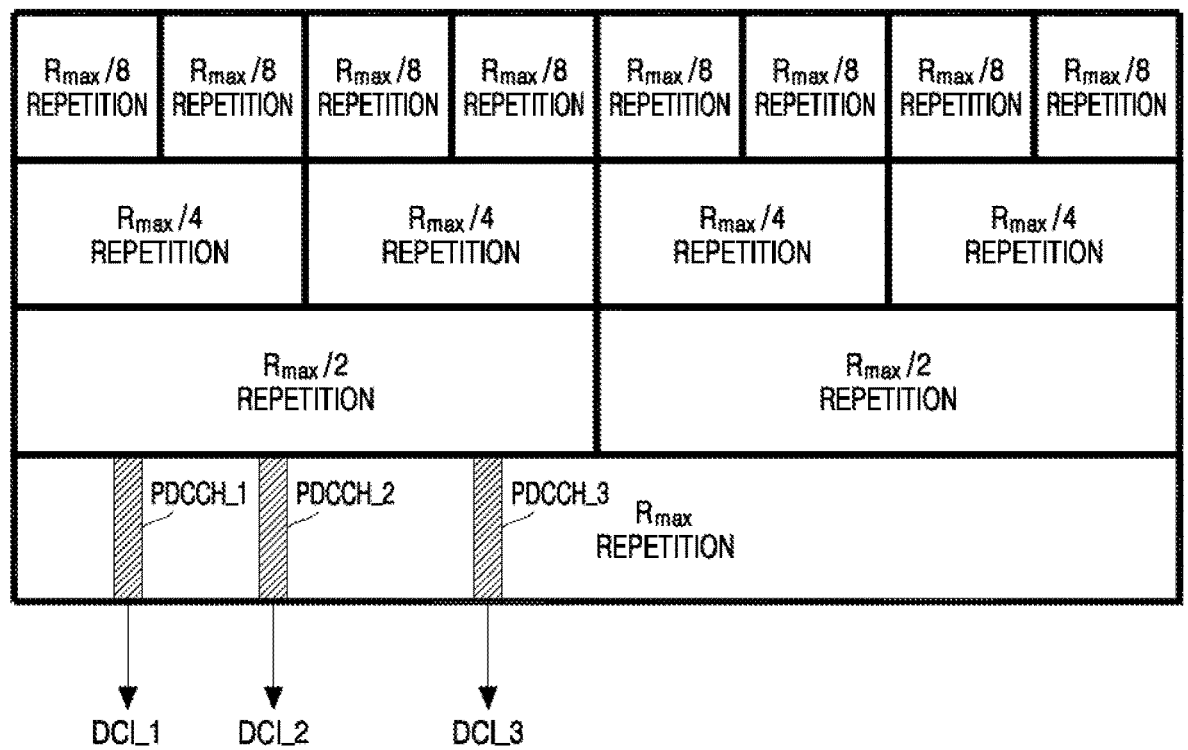
FIG. 7B is a diagram for explaining an method of operating a wireless communication apparatus in consideration of a transmission pattern of the PDCCH of FIG. 7A, according to an embodiment of the inventive concept.

FIG. 7A is a diagram for explaining a PDCCH repeatedly transmitted in a search space. FIG. 7B is a diagram for explaining an method of operating a wireless communication apparatus in consideration of a transmission pattern of the PDCCH of FIG. 7A, according to an embodiment of the inventive concept. In FIG. 7B, the M (or the reference value) of FIG. 6 may be assumed to be set to 2.

Referring to FIG. 7A, a base station may repeatedly transmit a PDCCH to a wireless communication apparatus in a certain search space. In detail, the base station may transmit the PDCCH to the wireless communication apparatus, based on one of a maximum number of times of repeated transmission $R_{max}$, a maximum number of times of repeated transmission/2 $R_{max}/2$, a maximum number of times of repeated transmission/4 $R_{max}/4$, and a maximum number of times of repeated transmission/8 $R_{max}/8$. Because the wireless communication apparatus may not understand how many times the base station repeatedly transmits the PDCCH until control information is obtained, the wireless communication apparatus may perform blind decoding on a plurality of candidate PDCCHs present in a search space based on the maximum number of times of repeated transmission Rmax.

Referring to FIG. 7B, the wireless communication apparatus may obtain first control information DCI_1 from a first candidate PDCCH PDCCH_1 corresponding to a first subframe by first decoding and a first CRC. The wireless communication apparatus may store the first control information DCI_1 as target control information in a memory. Therefore, the wireless communication apparatus may obtain second control information DCI_2 from a second candidate PDCCH PDCCH_2 corresponding to a second subframe by second decoding and a second CRC. The wireless communication apparatus may read the first control information DCI_1 from the memory. Additionally, the wireless communication apparatus may compare the first control information DCI_1 with the second control information DCI_2 to determine whether the first control information DCI_1 and the control information DCI_2 are identical to each other.

When the first control information DCI_1 and the second control information DCI_2 are not identical to each other, the wireless communication apparatus may compare third control information DCI_3 with the first control information DCI_1 to determine whether the third control information DCI_3 and the first control information DCI are identical to each other. The third control information DCI_3 may be obtained from a third candidate PDCCH PDCCH_3 corresponding to a third subframe by third blind decoding and a third CRC. The wireless communication apparatus may determine that the first control information DCI_1 may or may not cause a false alarm and perform channel scheduling using the first control information DCI_1 when the first control information DCI_1 and the third control information DCI_3 are identical to each other.

When the first control information DCI_1 and the second control information DCI_2 are not identical to each other, the wireless communication apparatus may delete the first control information DCI_1 stored in the memory and store the second control information DCI_2 as a target control information in the memory. Therefore, the wireless communication apparatus may read the second control information DCI_2 from the memory, compare the second control information DCI_2 with the third control information DCI_3. The comparison may determine whether the second control information DCI_2 and the third control information DCI_3 are identical with each other to verify the second control information DCI_2.

In addition, when the wireless communication apparatus fails to obtain control information determined to not cause a false alarm as a result of performing blind decoding for the search space, the wireless communication apparatus may prepare for blind decoding of the PDCCH in a next search space by deleting the target control information stored in the memory.

Figure 8:
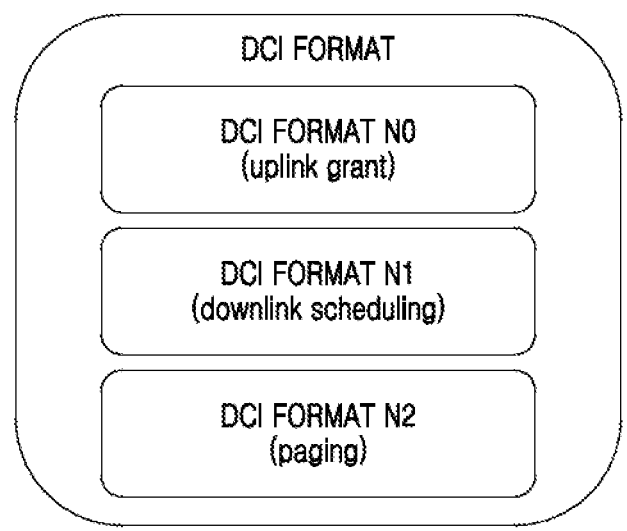
FIG. 8 is a diagram for explaining a control information format according to an embodiment of the inventive concept.

FIG. 8 is a diagram for explaining a control information format according to an embodiment of the inventive concept.

Referring to FIG. 8, the control information format (a DCI format) may include an N0 type control information format (DCI format N0), an N1 type control information format (DCI format N1), and an N2 type control information format (DCI format N2). The N0 type control information format (DCI format N0) relates to an uplink grant. The N0 type control information format may be used for scheduling of a PUSCH at an uplink cell. and may include information regarding a flag for format identification, subcarrier indication, resource assignment, scheduling delay, modulation and coding schemes, redundancy version, a repetition number, a new data indicator, and a DCI subframe repetition number. The N1 type control information format (DCI format N1) relates to a downlink scheduling, and may include information regarding a flag for format identification, a number of times of starting repetition of a physical random access channel (PRACH), subcarrier indication of the PRACH, scheduling delay, resource allocation, modulation and coding schemes, a repetition number, a new data indicator, HARQ-ACK resources, a DCI subframe repetition number. The N2 type control information format (DCI format N2) relates to paging, and may include information regarding a flag for distinguishing between paging and direct indication, direct indication information or resource assignment, modulation and coding schemes, a repetition number, and a DCI subframe repetition number.

According to embodiments of the inventive concept, a wireless communication apparatus is capable of determining whether a false alarm may be caused by each of pieces of control information corresponding to various types of control information formats of FIG. 8. Additionally, the wireless communication apparatus may perform channel scheduling using control information determined not to cause a false alarm. The inventive concept is applicable to other various control information formats, as well as the formats illustrated in FIG. 8.

Figure 9:
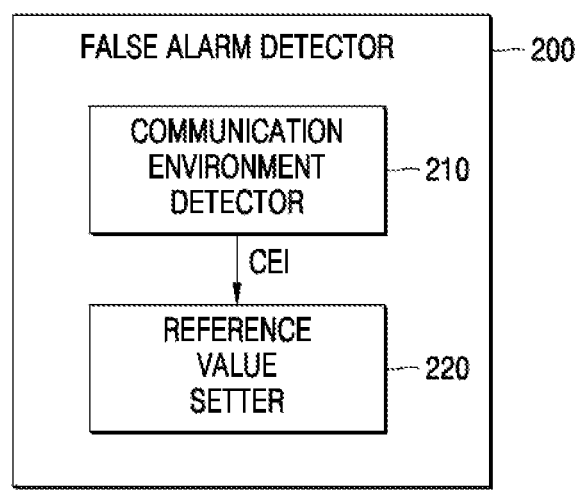
FIG. 9 is a block diagram of a false alarm detector for setting a reference value according to a communication environment, according to an embodiment of the inventive concept.

FIG. 9 is a block diagram of a false alarm detector 200 for setting a reference value according to a communication environment, according to an embodiment of the inventive concept.

Referring to FIG. 9, the false alarm detector 200 may include a communication environment detector 210 and a reference value setter 220. The communication environment detector 210 may detect a communication environment between a wireless communication apparatus and a base station. In one embodiment, the communication environment detector 210 may detect the communication environment by measuring at least one of signals received from the base station (e.g., a reference-signal received power (RSRP), a reference-signal received quality (RSRQ), a signal-to-interference-and-noise ratio (SINR) and a signal-to-noise ratio (SNR) of a reference signal). The communication environment detector 210 may detect the communication environment of the wireless communication apparatus in real time in other various ways. The communication environment detector 210 may also provide communication environment information (CEI), including a detection result, to the reference value setter 220.

The reference value setter 220 may set a reference value (M of FIG. 6) based on the communication environment information (CEI). For example, the reference value setter 220 may increase the reference value to increase strength of verification of target control information when a current communication environment of the wireless communication apparatus is poor. Additionally, the reference value setter 220 may reduce the reference value to reduce the strength of verification of the target control information when the current communication environment of the wireless communication apparatus is good, based on the CEI.

As described above, according to an embodiment of the inventive concept, a wireless communication apparatus is capable of adaptively changing the reference value according to a communication environment. Additionally, a wireless communication apparatus may perform blind decoding on a PDCCH according to the communication environment or detecting a false alarm.

Figure 10:
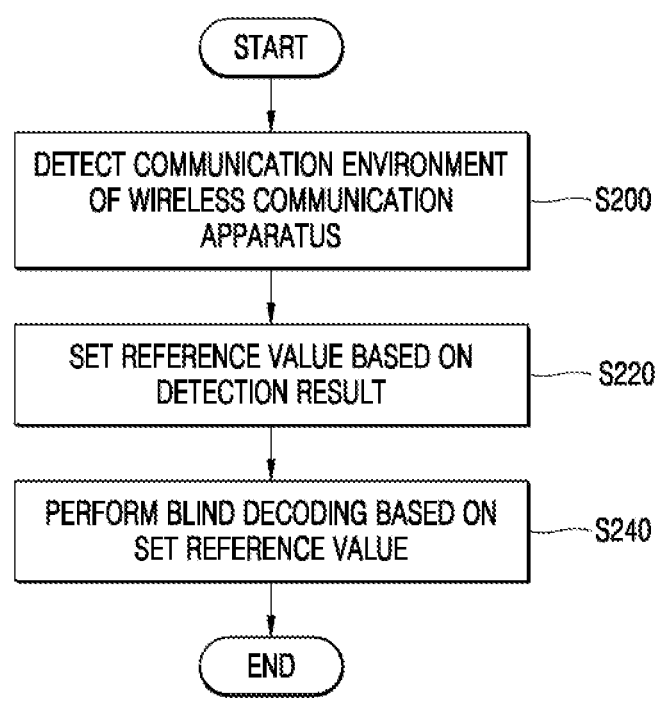
FIG. 10 is a flowchart for explaining an operation of the false alarm detector of FIG. 9.

FIG. 10 is a flowchart for explaining an operation of the false alarm detector 200 of FIG. 9. For brevity of explanation, FIG. 10 will be described with reference to FIG. 9 below.

Referring to FIG. 10, the communication environment detector 210 may detect a communication environment of a wireless communication apparatus (S200). The reference value setter 220 may set a reference value based on a detection result (S220). The wireless communication apparatus may perform blind decoding on a PDCCH, based on the set reference value (S240).

Figure 11:
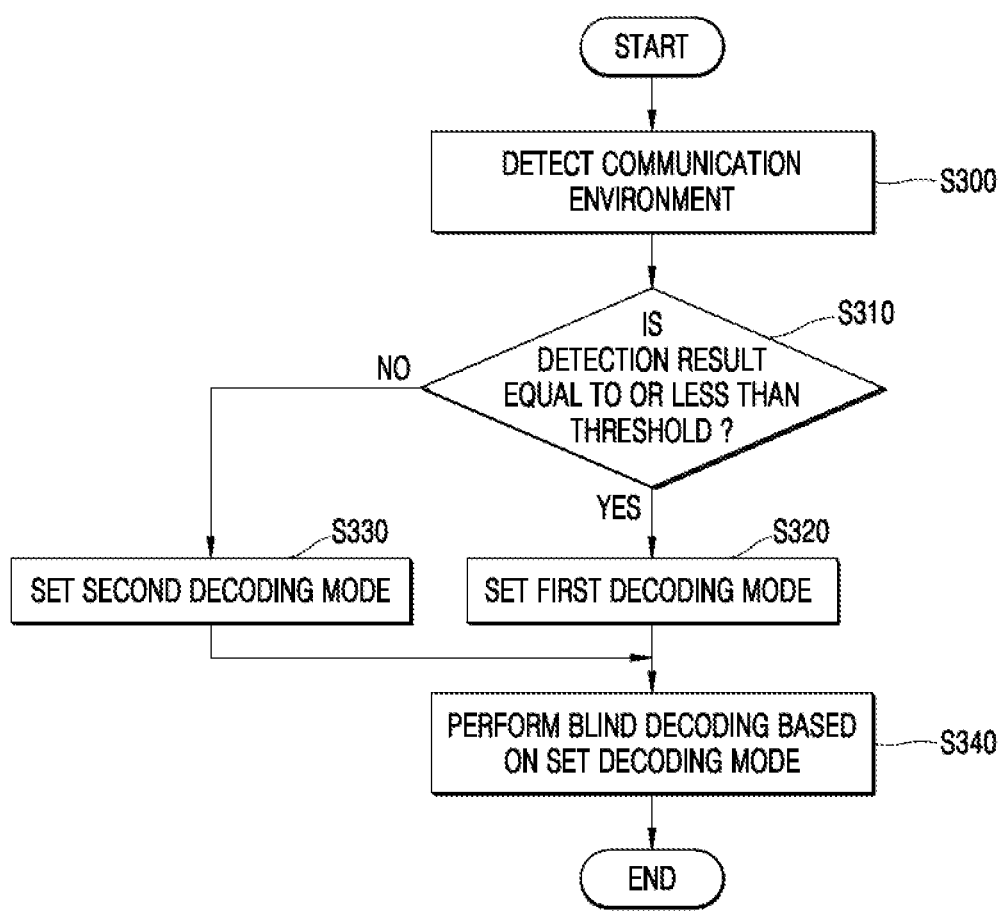
FIG. 11 is a flowchart for explaining a wireless communication apparatus operated by selectively setting a decoding mode, according to an embodiment of the inventive concept.

FIG. 11 is a flowchart for explaining a wireless communication apparatus operated by selectively setting a decoding mode, according to an embodiment of the inventive concept. Hereinafter, a first decoding mode may refer to an method for detecting a false alarm, according to embodiments of the inventive concept. Additionally, a second decoding mode may refer to an operating mode provided by a processor to be applied for channel scheduling without any additional comparisons when control information obtained by blind decoding passes a CRC.

Referring to FIG. 11, the wireless communication apparatus may detect a communication environment (S300). The wireless communication apparatus may determine whether a detection result is equal to or less than a threshold (S310). The wireless communication apparatus may set the first decoding mode (S320) when 'Yes' is determined in operation S310 and set the second decoding mode (S330) when 'No' is determined in operation S310. The wireless communication apparatus may perform blind decoding on a PDCCH, based on the set decoding mode (S340). As described above, the wireless communication apparatus may be operated in the second decoding mode to perform channel scheduling quickly when the communication environment is very good. The wireless communication apparatus may also be operated in the first decoding mode to ensure communication performance and reduce unnecessary power consumption when the communication performance is very poor.

Figure 12:
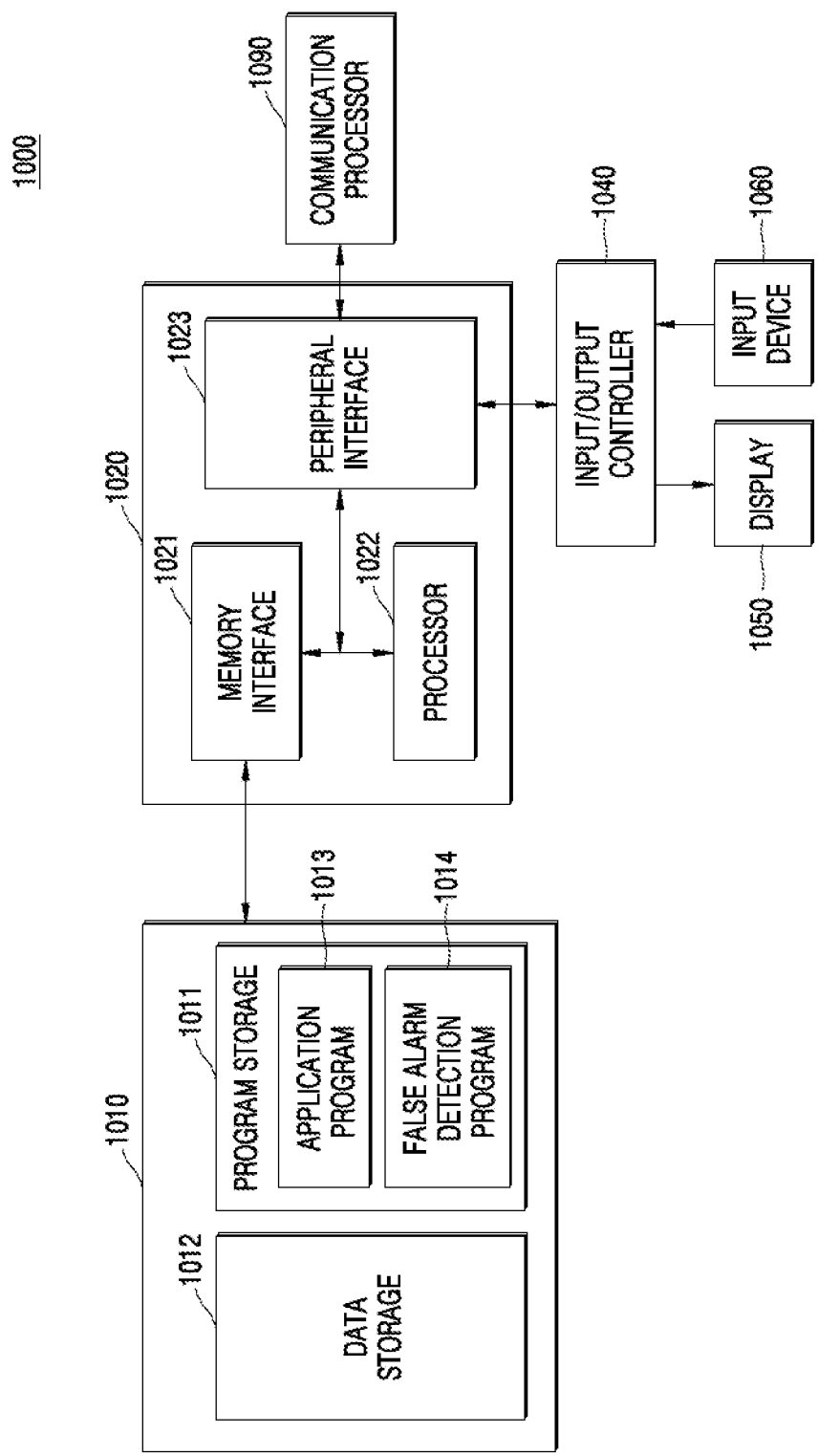
FIG. 12 is a block diagram of an electronic apparatus according to an embodiment of the inventive concept.

FIG. 12 is a block diagram of an electronic apparatus 1000 according to an embodiment of the inventive concept.

Referring to FIG. 12, the electronic apparatus 1000 may include a memory 1010, a processor unit 1020, an input/output controller 1040, a display 1050, an input device 1060, and a communication processor 1090. Here, a plurality of memories 1010 may be provided. These components will be described below.

The memory 1010 may include a program storage 1011 that stores a program for control of an operation of the electronic apparatus 1000. The memory 1010 may also include a data storage 1012 that stores data generated during an execution of a program. The data storage 1012 may store data for the execution of an application program 1013 and a false alarm detection program 1014. The program storage 1011 may store the application program 1013 and the false alarm detection program 1014. Here, the programs included in the program storage 1011 may be represented by an instruction set which is a set of instructions.

The application program 1013 includes an application program executed in the electronic apparatus 1000. For example, the application program 1013 may include instructions of an application run by a processor 1022. According to embodiments of the inventive concept the false alarm detection program 1014 may include instructions executed by the processor 1022 to verify whether target control information may cause a false alarm.

A peripheral interface 1023 may control connection among an input/output peripheral of a base station, the processor 1022, and a memory interface 1021. The processor 1022 controls the base station to provide a corresponding service by using at least one software program. In this case, the processor 1022 may execute at least one program stored in the memory 1010 to provide a service corresponding to this program.

The input/output controller 1040 may provide an interface between an input/output device, such as the display 1050 and the input device 1060, and the peripheral interface 1023. The display 1050 displays information such as status information, input characters, moving pictures, still pictures, and the like. For example, the display 1050 may display information regarding an application program executed by the processor 1022.

The input device 1060 may provide the processor unit 1020 with input data generated by a selection of the electronic apparatus 1000 via the input/output controller 1040. In this case, the input device 1060 may include a keypad with at least one hardware button, a touchpad for detecting touch information, and the like. For example, the input device 1060 may provide the processor 1022 with touch information. Touch information may be considered a touch, a touch motion, and a touch release, which is sensed by the touchpad, via the input/output controller 1040. The electronic apparatus 1000 may include a communication processor 1090 that performs a communication function for voice communication and data communication.

Figure 13:
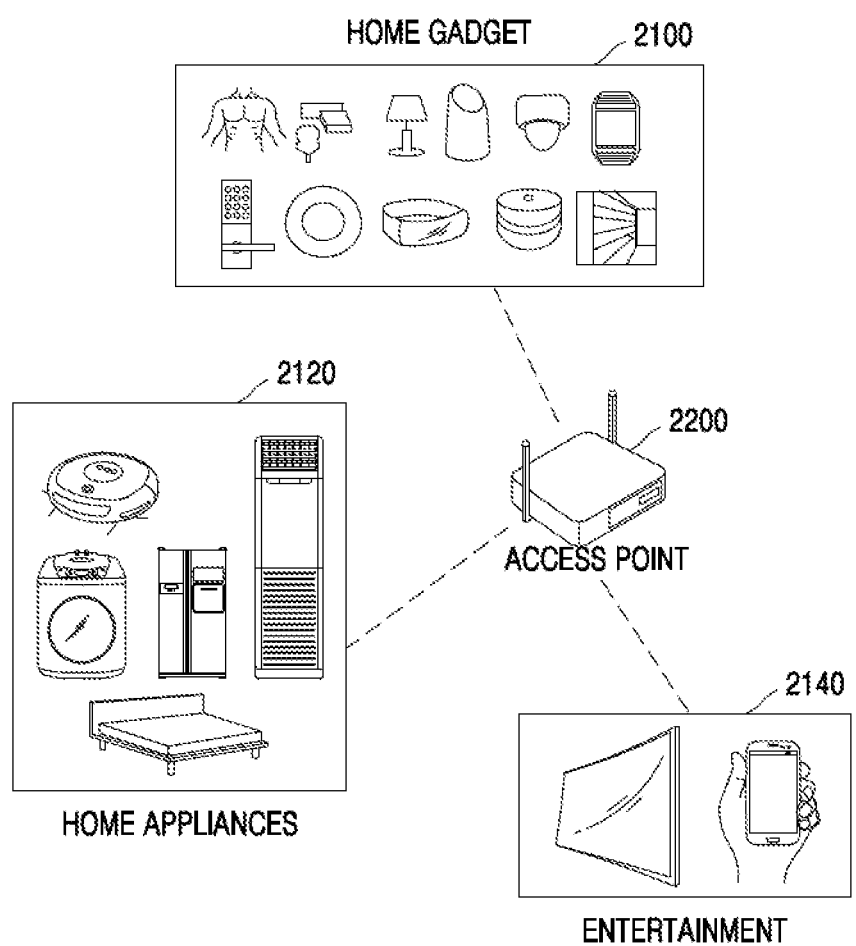
FIG. 13 is a diagram illustrating communication apparatuses which operate according to an embodiment of the inventive concept.

FIG. 13 is a diagram illustrating communication apparatuses which operate according to an embodiment of the inventive concept.

Referring to FIG. 13, according to embodiments of the inventive concept, a home gadget 2100, home appliances 2120, an entertainment device 2140, and an access point (AP) 2200 may perform a false alarm detection operation. In some embodiments, the home gadget 2100, the home appliances 2120, the entertainment device 2140, and the AP 2200 may form an Internet-of-Things (IoT) network system. The communication apparatuses of FIG. 13 are merely examples. Other communication apparatuses not shown in FIG. 13 may also be capable of performing the false alarm detection operation according to an embodiment of the inventive concept.

While the inventive concept has been particularly shown and described with reference to embodiments thereof, it will be understood that various changes in form and details may be made therein without departing from the spirit and scope of the following claims.

What is claimed is:

1. A method of operating a wireless communication apparatus, the method comprising:
receiving a repeated physical downlink control channel (PDCCH) from a base station;
performing blind decoding on a plurality of candidate PDCCHs based on an aggregation level of the repeated PDCCH;
performing a cyclic redundancy check (CRC) to obtain at least two pieces of control information passing the CRC from a blind decoding result;
comparing the at least two pieces of control information with each other; and
determining whether to terminate the blind decoding based on a comparison result.

2. The method of claim 1, wherein
the at least two pieces of control information comprise first control information and second control information obtained subsequent to the first control information, and
the comparing of the at least two pieces of control information with each other comprises determining whether the first control information and the second control information are identical to each other.

3. The method of claim 2, wherein
the at least two pieces of control information comprise third control information obtained subsequent to the second control information, and
when the first control information and the second control information are not identical to each other, the comparing of the at least two pieces of control information with each other further comprises comparing whether the second control information and the third control information are identical to each other.

4. The method of claim 2, wherein
the at least two pieces of control information comprise third control information obtained subsequent to the second control information, and
when the first control information and the second control information are identical to each other, the comparing of the at least two pieces of control information with each other further comprises comparing whether the first control information and the third control information are identical to each other.

5. The method of claim 2, further comprising
storing the first control information in a memory of the wireless communication apparatus for comparison with the second control information.

6. The method of claim 5, further comprising,
when the first control information and the second control information are not identical to each other:
deleting the first control information from the memory; and
storing the second control information in the memory for comparison with other control information obtainable subsequent to the second control information.

7. The method of claim 1, wherein
the determining of whether to terminate the blind decoding comprises:
determining whether a number of pieces of control information identical to target control information is greater or equal to a reference value; and
terminating the blind decoding when the number of pieces of control information is greater or equal to the reference value.

8. The method of claim 1, further comprising:
detecting a communication environment; and
setting the reference value based on a detection result of the communication environment.

9. The method of claim 8, wherein
the detecting of the communication environment comprises measuring at least one of a reference-signal received power (RSRP), a reference-signal received quality (RSRQ), a signal-to-interference-and-noise ratio (SINR), and a signal-to-noise ratio (SNR) of a signal received from the base station.

10. The method of claim 8, wherein
the setting of the reference value based on the detection result comprises setting the reference value lower when the communication environment improves.

11. A method of operating a wireless communication apparatus, the method comprising:
receiving a repeated physical downlink control channel (PDCCH) from a base station;
obtaining first control information by performing a first decoding and a first cyclic redundancy check (CRC) on a plurality of candidate PDCCHs based on an aggregation level of the repeated PDCCH;
obtaining second control information by performing a second decoding and a second CRC on the plurality of candidate PDCCHs;
determining whether the first control information and the second control information are identical to each other; and
performing channel scheduling for communication with the base station based on the determination.

12. The method of claim 11, wherein
the performing of channel scheduling comprises, when the first control information and the second control information are identical to each other, performing the channel scheduling based on the first control information.

13. The method of claim 11, further comprising,
when the first control information and the second control information are not identical to each other:
obtaining third control information by performing a third decoding and a third CRC on the plurality of candidate PDCCHs; and
comparing whether the second control information and the third control information are identical to each other.

14. The method of claim 13, wherein
the performing of channel scheduling comprises, when the second control information and the third control information are identical to each other, performing the channel scheduling based on the second control information.

15. The method of claim 11, further comprising
storing the first control information in a memory of the wireless communication apparatus for comparison with the second control information.

16. The method of claim 15, further comprising,
when the first control information and the second control information are not identical to each other:
deleting the first control information from the memory; and
storing the second control information in the memory for comparison with other control information obtainable subsequent to the second control information.

17. A wireless communication apparatus comprising:
a transceiver configured to receive a physical downlink control channel (PDCCH) repeatedly transmitted by a base station in a search space; and
a processor configured to perform blind decoding on a plurality of candidate PDCCHs based on an aggregation level of the PDCCH,
wherein the processor is further configured to compare at least two pieces of control information passing a cyclic redundancy check (CRC) from a blind decoding result with each other, and to perform channel scheduling for communication with the base station, based on a comparison result.

18. The wireless communication apparatus of claim 17, wherein
the at least two pieces of control information comprise first control information, and at least one piece of second control information obtained subsequent to the first control information, and the processor is further configured to compare the first control information with the at least one piece of second control information, and perform the channel scheduling based on the first control information when a number of results indicating that the first control information is identical to the at least one piece of second control information is greater or equal to a reference value.

19. The wireless communication apparatus of claim 18, wherein the processor is further configured to set the reference value based on a communication environment between the base station and the wireless communication apparatus.

20. The wireless communication apparatus of claim 18, wherein the processor is further configured to, when the first control information and the at least one piece of second control information are not identical to each other, delete the first control information from a memory, and store second control information in the memory for comparison with other control information obtainable subsequent to the at least one piece of second control information.

* * * * *